US008545294B1

(12) United States Patent
Stevens

(10) Patent No.: US 8,545,294 B1
(45) Date of Patent: Oct. 1, 2013

(54) FIELD DRESSING APPARATUS AND SYSTEM

(71) Applicant: Daniel W. Stevens, Brookfield, WI (US)

(72) Inventor: Daniel W. Stevens, Brookfield, WI (US)

(73) Assignee: Deer Surgeon, Inc, Brookfield, WI (US)

( * ) Notice: Subject to any disclaimer, the term of this patent is extended or adjusted under 35 U.S.C. 154(b) by 0 days.

(21) Appl. No.: 13/758,199

(22) Filed: Feb. 4, 2013

Related U.S. Application Data

(60) Provisional application No. 61/602,295, filed on Feb. 23, 2012.

(51) Int. Cl.
*A22B 5/18* (2006.01)

(52) U.S. Cl.
USPC .......... 452/120

(58) Field of Classification Search
USPC .......... 452/102–105, 120, 125, 128, 149, 452/185, 194, 197
See application file for complete search history.

(56) References Cited

U.S. PATENT DOCUMENTS 3,771,808 A * 11/1973 Duerst .......... 280/19
5,336,124 A * 8/1994 Garside .......... 452/125
5,483,925 A * 1/1996 Childress .......... 119/795
6,065,790 A * 5/2000 Oswald .......... 294/74
6,142,547 A * 11/2000 Bowerman .......... 294/150
6,250,699 B1 * 6/2001 Robertson .......... 294/153
6,569,005 B2 * 5/2003 Maxwell .......... 452/128
7,264,544 B2 * 9/2007 Tokarski et al. .......... 452/198
7,387,566 B2 * 6/2008 Dunagan .......... 452/102
7,547,024 B1 * 6/2009 Dell .......... 280/18
8,292,341 B1 * 10/2012 Sokoly .......... 294/152
8,402,685 B1 * 3/2013 Marshall .......... 43/3
8,459,327 B2 * 6/2013 Livacich .......... 160/135

* cited by examiner

*Primary Examiner* — Richard Price, Jr.
(74) *Attorney, Agent, or Firm* — Donald J. Ersler

(57) ABSTRACT

A field dressing apparatus and system preferably includes a plurality of ground stabilizing components, a plurality of a tethering members and a plurality of engaging components. Each ground stabilizing component includes a shaft element that extends from a handle element. A proximal end of the tethering member is secured to the ground stabilizing component and a distal end is secured to the engaging component. The engaging component preferably includes a hook section, a gripping section and a ring section. The hook section extends from one end of the gripping section and the ring section is disposed on the other end of the gripping section. The distal end of the tethering member is secured to the ring section of the engaging component. A second embodiment of the dressing apparatus and system includes the plurality of a tethering members, a plurality of engaging components and a compacting securing panel.

10 Claims, 5 Drawing Sheets

1
20
12
11
32
10
33
30
31
100

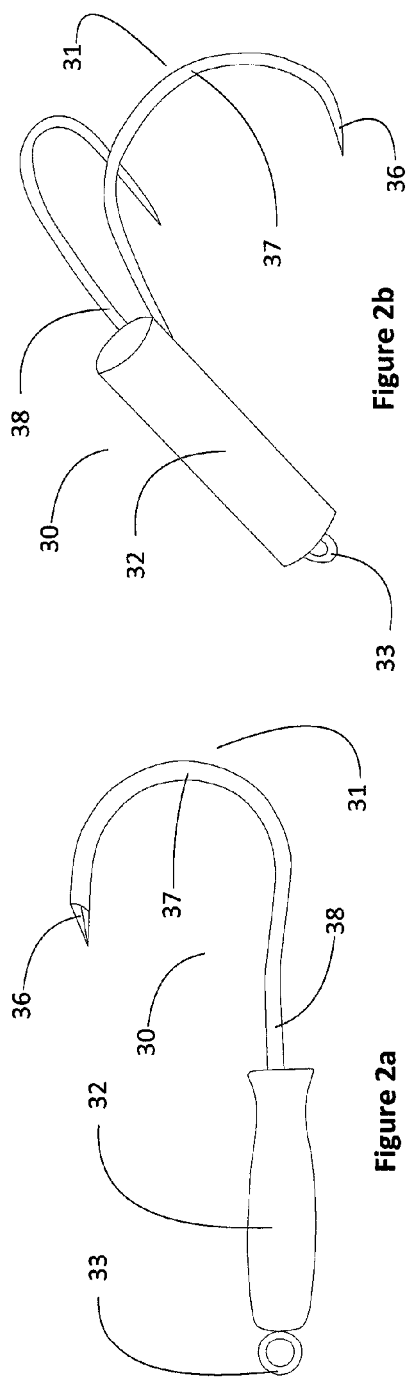
Figure 2b
Figure 2a
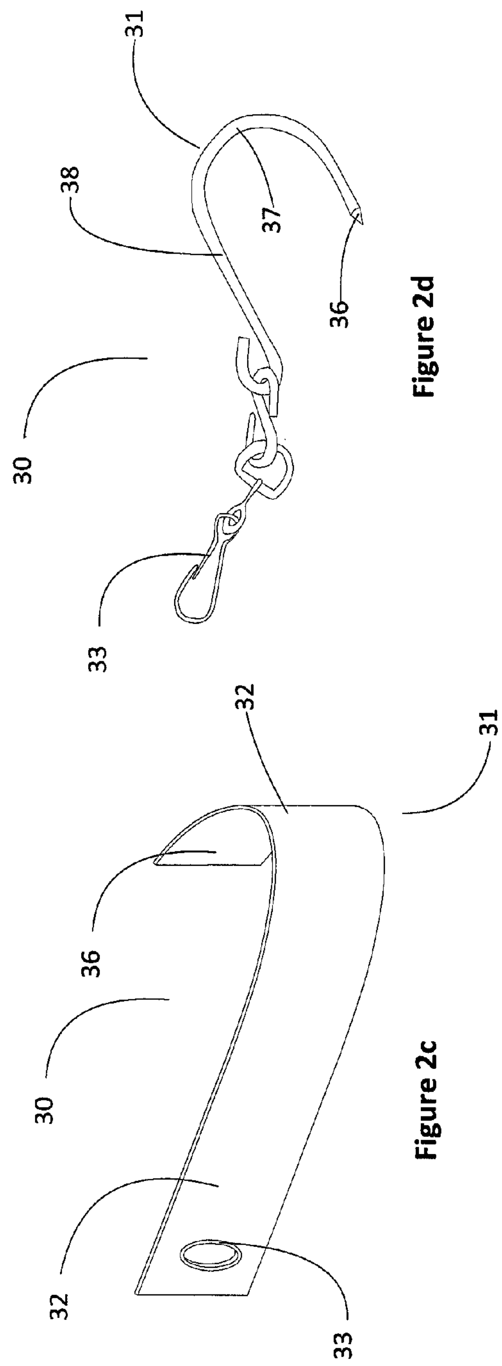
Figure 2d
Figure 2c

FIELD DRESSING APPARATUS AND SYSTEM

CROSS-REFERENCES TO RELATED APPLICATIONS

This is a utility patent application taking priority from provisional application No. 61/602,295 filed on Feb. 23, 2012.

BACKGROUND OF THE INVENTION

1. Field of the Invention

The present invention relates generally to hunting and more specifically to a field dressing apparatus and system, which includes tools for field dressing animals.

2. Discussion of the Prior Art

By some estimates, there are approximately 11,000,000 deer hunters in the U.S., who annually contribute $20,000,000,000.00 to the economy, including money spent on hunting accessories carried by major sporting goods distribution outlets. Accessories in this sporting goods market niche include clothes, equipment-cases, camouflage, and generally any equipment used to make hunting easier and more efficient.

Field dressing is the process of removing the internal organs of hunted game. It is a necessary step in preserving meat. Field dressing must be done as soon as possible in order to ensure rapid body heat loss, and prevent bacteria from growing on the surface of the carcass. This is usually done at or near the site where the wild game was killed.

Field dressing an animal can be difficult for one person to perform. In order to field dress an animal, the animal is typically laid on their back with the animal's limbs held away from the animal's body. Positioning and holding the animal in place is physically difficult, and thus it usually takes two hunters to perform this process.

Accordingly, there is a clearly felt need in the art for a field dressing apparatus and system, which includes lightweight, easily transportable tools that can be readily carried by a hunter to a field dressing-site; and which can be packaged, mass produced and made available to hunters at retail outlets.

SUMMARY OF THE INVENTION

The present invention provides a dressing apparatus and system, which includes tools for field dressing animals. The field dressing apparatus and system preferably includes a plurality of ground stabilizing components, a plurality of a tethering members and a plurality of engaging components. Each ground stabilizing component includes a handle element and a shaft element. The shaft element extends from the handle element. Each tethering member includes a proximal and distal end. The proximal end of the tethering member is preferably secured to the handle member, but could be secured to the shaft element and the distal end secured to the engaging component. The engaging component preferably includes a hook section, a gripping section and a ring section (attachment portion). The hook section extends from one end of the gripping section and the ring section is disposed on the other end of the gripping section. The distal end of the tethering member is secured to the ring section of the engaging component. An optional tool component with a bladed surface, such as a hatchet, may be supplied with the system.

In use, the tool component is used to cut a longitudinal slit in a pelvis of the animal. The hook section is engaged with a leg or in the longitudinal slit formed in the animal, and the handle member is pulled tight and inserted into the ground. The process is repeated, until an inside of the animal is fully exposed.

A second embodiment of the dressing apparatus and system includes the plurality of a tethering members, a plurality of engaging components and a compacting securing panel. The compacting securing panel is first placed under the animal. Instead of inserting the ground stabilizing components into the ground, the proximal end of the tethering member is secured to a hole in the compacting securing panel.

BRIEF DESCRIPTION OF THE DRAWINGS

FIG. 2*a* is a side view of an engaging component with a single hook construction of a field dressing apparatus and system.

FIG. 2*b* is a perspective view of an alternative embodiment of an engaging component with a dual hook construction of a field dressing apparatus and system.

FIG. 2*c* is a perspective view of a second alternative embodiment of an engaging component, which utilizes a flat panel of a field dressing apparatus and system.

FIG. 2*d* is a perspective view of a third alternative embodiment of an engaging component having a chain and a clasp assembly and a single hook construction of a field dressing apparatus and system.

GLOSSARY

Figure 1A:
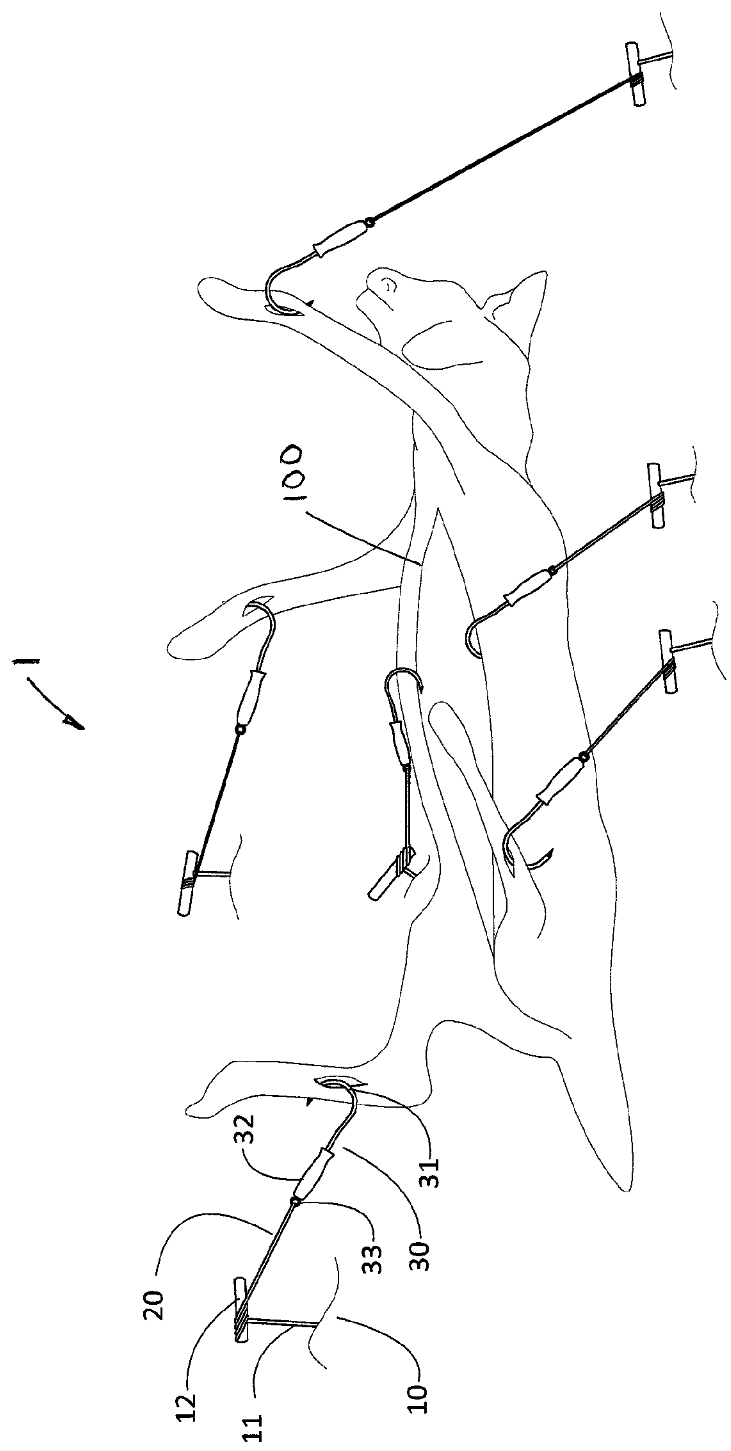
FIG. 1*a* is a perspective view of a field dressing apparatus and system used to field dress an animal.

As used herein, the term "eccentric" means having a connection away from the geometric center. As used herein, the term "engaging component" refers to a device capable of engaging an animal carcass for the purpose of field dressing apparatus and system.

DETAILED DESCRIPTION OF THE PREFERRED EMBODIMENTS

For the purpose of promoting an understanding of the present invention, references are made in the text to exemplary embodiments of a field dressing apparatus and system, only some of which are described herein. It should be understood that no limitations on the scope of the invention are intended by describing these exemplary embodiments. One of ordinary skill in the art will readily appreciate that alternate, but functionally equivalent shapes and structures may be utilized. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms “substantially” or “approximately” as used herein may be applied to modify any quantitative representation that could permissibly vary without resulting in a change in the basic function to which it is related.

Figure 1B:
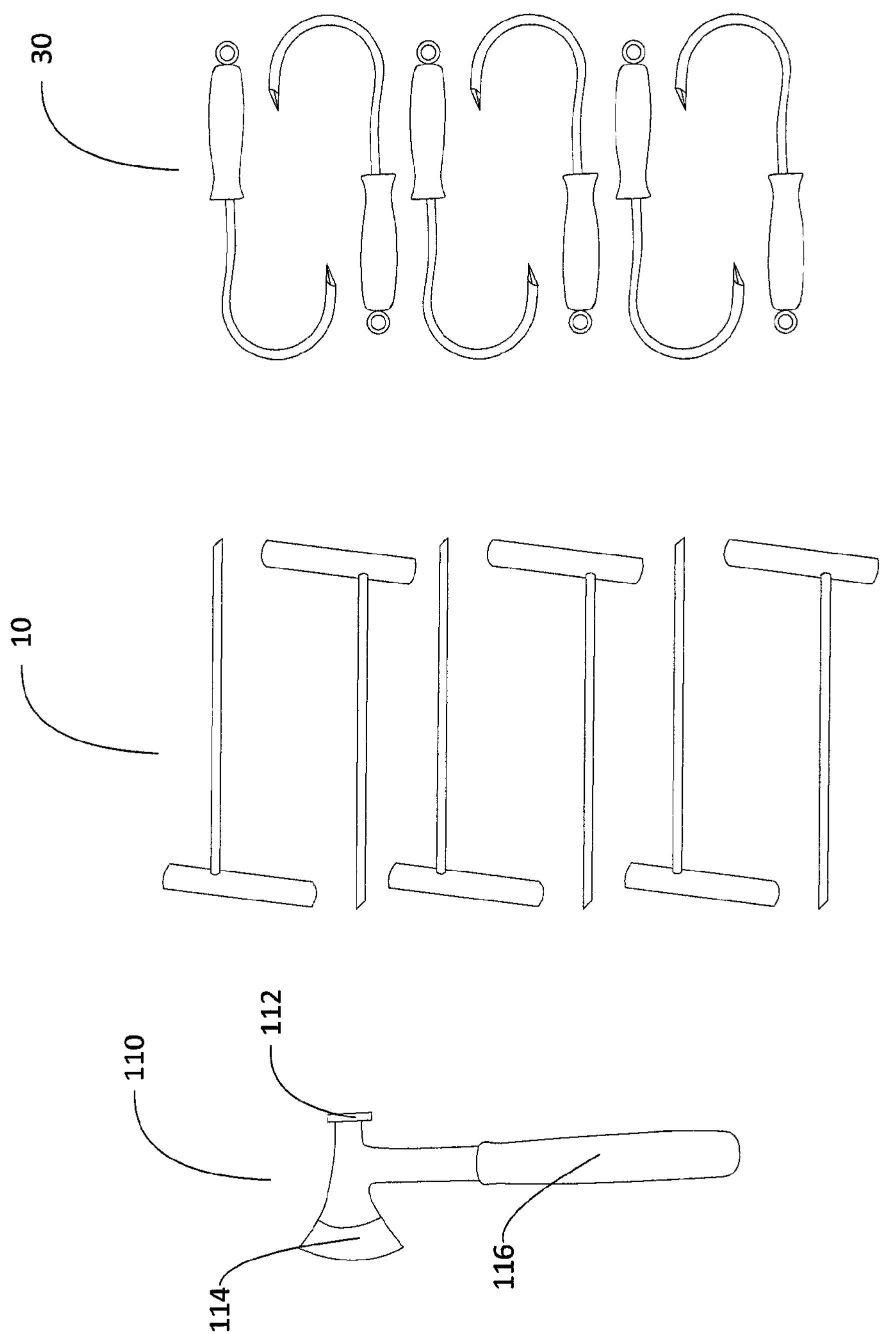
FIG. 1*b* is a top view of components of a field dressing apparatus and system.

FIG. 1*a* is a field dressing system 1, which is comprised of ground stabilizing, tethering, and engaging components with an optional tool component (shown in FIG. 1*b*).

In the embodiment shown, ground stabilizing components 10 include a handle element 12 and a shaft element 11. In the present embodiment the shaft element 11 of the ground stabilizing components 10 have been partially inserted into the ground.

In the exemplary embodiment shown, ground stabilizing components 10 are stakes, as known in the art, and include handles 12 for operatively coupling tethering members 20. In alternative embodiments, ground stabilizing components 10 may be operatively coupled to tethering members 20 through an aperture. In other embodiments, handles 12 may be hollow.

FIG. 1*a* further illustrates tethering members 20, which in the embodiment shown are preferably rope. In this embodiment, each tethering member 20 includes a proximal and distal end, with each tethering member 20 operatively secured to the handle element 12 at the proximal end. However, the proximal end of the tethering member 20 may also be secured to the shaft element 11.

As illustrated in the exemplary embodiment shown, tethering members 20 may be as thin as possible while still maintaining a minimum tensile strength such that they are capable of holding the rib cage of an animal open and spreading the legs of the animal away from the torso. Further, tethering members 20 are preferably non-porous.

In other embodiments, tethering members 20 may be made of materials that are un-reactive or minimally to disinfectants and/or detergents or impermeable. In some exemplary embodiments, tethering member 20 may be machine washable. In still further exemplary embodiments, tethering members 20 may be made of chain, cable, or any other material or combinations of materials known in the art to maintain the necessary tensile strength. In yet further exemplary embodiments, tethering member 20 may be comprised of a material that resists tangling. Finally, the tethering members 20 may also be fabricated from a nylon material or an elastic material.

Also shown in FIG. 1*a* are engaging components 30. In the present embodiment, engaging components 30 each preferably include a hook section 31, a gripping section 32 and a ring section 33. In the exemplary embodiment shown, the distal end of tethering members 20 are operatively connected to the ring section 33 of engaging components 30. Further, each engaging component 30 is operatively connected to the animal to be field dressed at the hook end.

FIG. 1*b* illustrates components of an exemplary embodiment of the field dressing apparatus and system 1. In the embodiment shown, field dressing apparatus and system includes optional tool component 110 having a flat surface 112, a bladed surface 114, and a handle 116. In alternative embodiments, tool component 110 may be hollow.

In the present embodiment, the flat surface 112 may be used to drive ground stabilizing components 10 into the ground. In the present embodiment, the bladed surface 114 may be used for field dressing the animal, for example, splitting the pelvis of the animal to form a longitudinal slit 100.

FIG. 2*a* is an exemplary embodiment of an engaging component 30 for field dressing apparatus and system. Engaging component 30 includes a hook section 31, a gripping section 32, and a ring section 33. The hook section 31 includes a point section 36, a curved section 37, and a stem 38. In alternative embodiments, hook section 31 may be hollow and/or made of aluminum, steel, or plastic. In the embodiment shown, the point section 36 is tapered. In alternative embodiments, the point section 36 may be flat.

In the embodiment shown, curved section 37 is shaped like a half circle. In the present embodiment, the circumference of the half circle may be minimally small to reduce size, but not so small that the curved section is unable to hook onto the rib cage of an animal without slipping. The stem 38 may vary in length and width. In alternative embodiments, the stem is a minimal length, but still allows the curved section to hook around the rib cage without slipping.

In the embodiment shown, engaging component 30 includes a gripping section 32. In the present embodiment, the gripping section 32 is separate from the stem 38, but in alternative embodiments the stem 38 may be integrated into a single piece. Further, alternative embodiments of the gripping section 32 may contain an aperture to allow engaging components to interlock. Additionally, alternative embodiments of the gripping section 32 may be hollow.

FIG. 2*b* illustrates an alternative embodiment of the engaging component 30. The engaging component 30 contains the hook section 31, which in the exemplary embodiment shown is dual hooks. Engaging component 30 also contains the gripping section 32, and the ring section 33.

FIG. 2*c* is a second alternate embodiment of the engaging component 30. The engaging component 30 is includes a single piece of curved material. In the present embodiment, the gripping section 32 and the stem 38 of the engaging component 30 have been integrated into a single piece of material.

FIG. 2*d* is a third embodiment of the engaging component 30. In the present embodiment, the engaging component 30 includes the hook section 31 and a chain assembly 33 secured to the hook section 31.

Figure 3B:
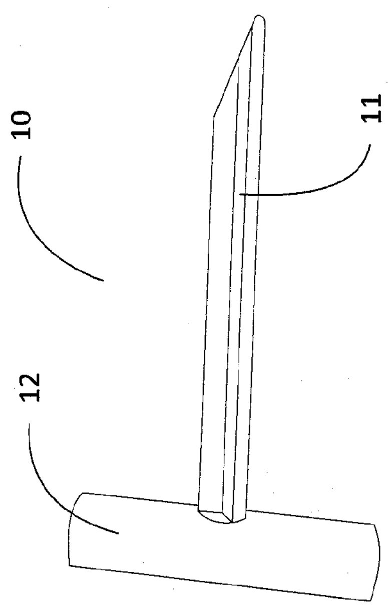
FIG. 3*b* is a side view of a ground stabilizing component with a centered handle of a field dressing apparatus and system.
Figure 3C:
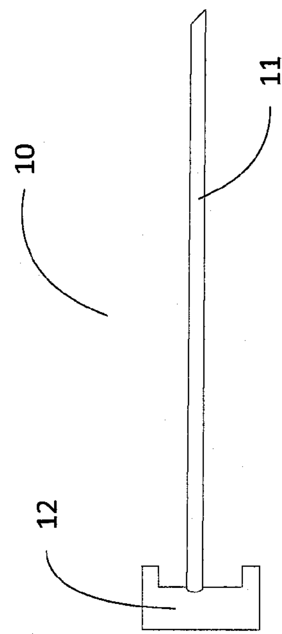
FIG. 3*c* is a side view of an alternative embodiment of a ground stabilizing component with a centered handle of a field dressing apparatus and system.
Figure 3A:
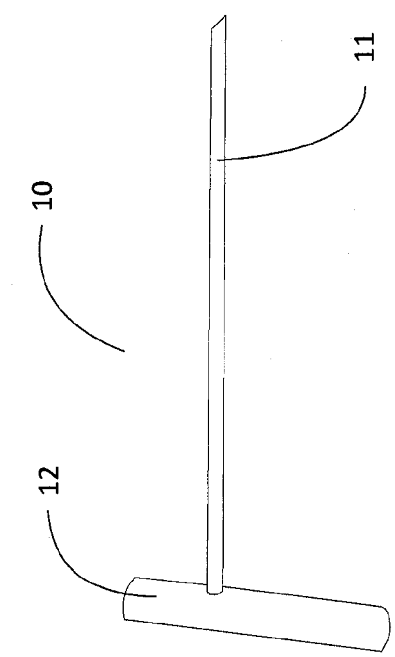
FIG. 3*a* is a side view of a ground stabilizing component with an eccentric handle of a field dressing apparatus and system.

FIG. 3*a* is an exemplary embodiment of the ground stabilizing component 10, which includes handle element 12 and shaft element 11. In the present embodiment, the shaft element 11 has a proximal and a distal end, and the distal end is operatively connected to the eccentric handle element 12. In the present embodiment, the proximal end is tapered. In alternative embodiments, the proximal end may be flat. In still further exemplary embodiments, the shaft element 11 may be connected to the handle at the handle’s midpoint.

In the exemplary embodiment shown, the angle between the shaft element 11 and the handle element 12 is about 90°. In alternative exemplary embodiments, the angle may vary from 15° to 175°.

In still further exemplary embodiments, the shaft element 11 and the handle element 12 may vary in length. Ideally, the handle element 12 and the shaft element 11 are of a minimal size, while still large enough to be gripped-and provide stabilization. In still further exemplary embodiments, shaft element 11 and handle element 12 may be hollow, and the shaft element 11 maybe tapered.

FIG. 3*b* is an exemplary embodiment of an alternative ground stabilizing component 10, which includes the handle element 12 operatively connected to the shaft element 11. Handle element 12 includes a proximal and a distal surface.

The shaft element 11 includes a proximal and distal end. In the present embodiment, the distal end of the shaft element 11 is operatively connected to the handle element 12 at a midpoint between the proximal and distal surfaces. As illustrated, the proximal end of shaft element 11 is tapered to a point.

FIG. 3*c* is an exemplary embodiment of a ground stabilizing component 10, which includes the handle element 12 operatively connected to the shaft element 11. The handle element 12 includes a proximal surface, a distal surface, an upper surface, and a lower surface. In the exemplary embodiment shown, shaft element 11 is operatively connected to handle element 12 at a midpoint between the proximal and distal surfaces. The handle element 12 allows the shaft element 11 to be removed from the ground without any tools.

In other exemplary embodiments, the shaft element 11 is hollow. In still other embodiments not shown, the handle element 12 is hollow. In still further exemplary embodiments, the upper surface of the handle element 12 is flat.

Figure 4:
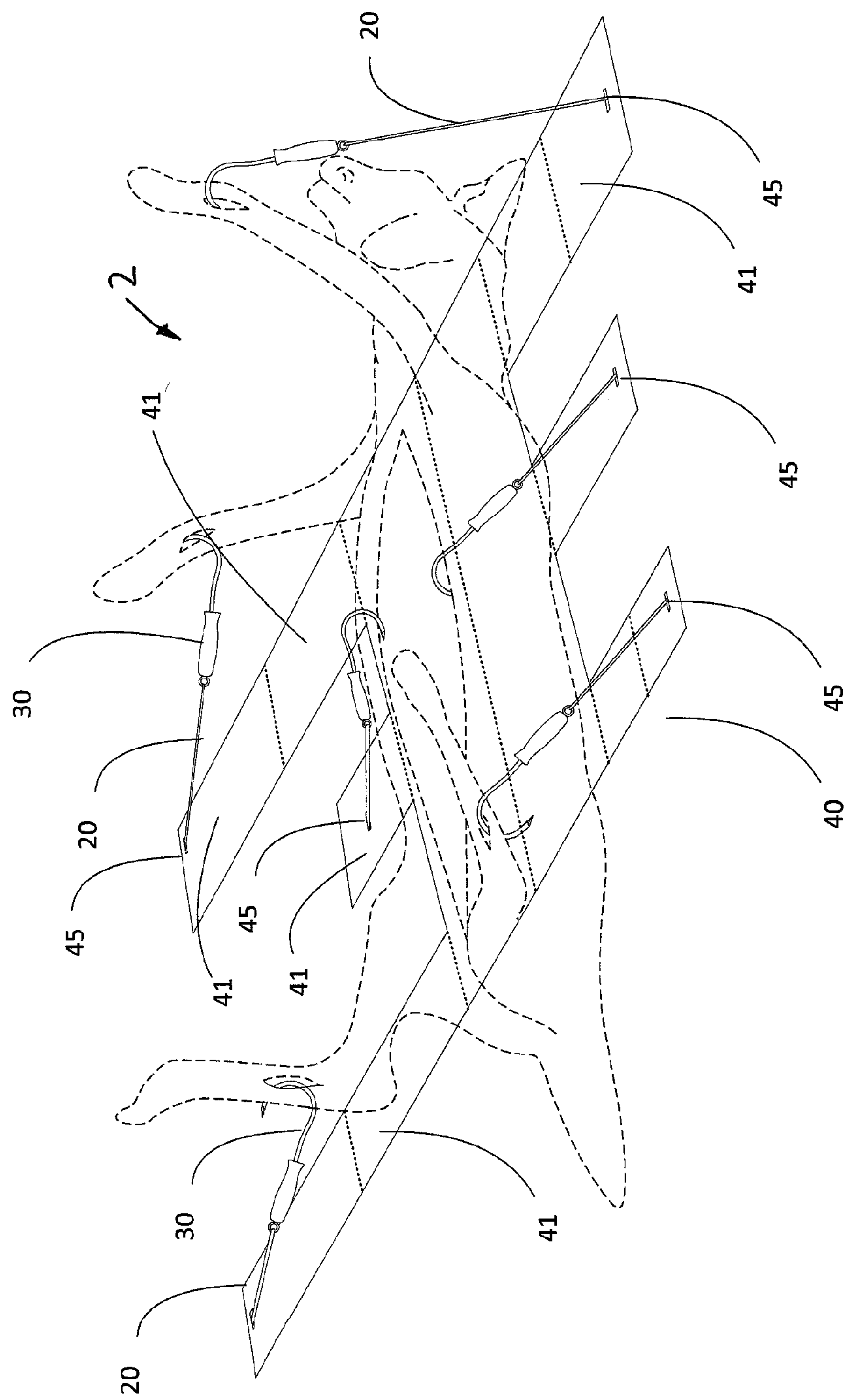
FIG. 4 is a perspective view of a second embodiment of a field dressing apparatus and system used to field dress an animal.

FIG. 4 is a second embodiment of a field dressing apparatus and system 2 with a compacting securing panel 40. The compacting securing panel 40 contains a plurality of subdivided surfaces 41, which compact when not in use to form a small, easily portable field dressing surface. The compacting securing panel 40 folds at hinges between subdivided surfaces 41. However, in other embodiments, the compacting securing panel 40 may telescope, separate, roll, or compact in any method known in the art.

As illustrated in FIG. 4, the compacting securing panel 40 contains a plurality of securing sites (securing portion) 45. In the exemplary embodiment shown, the securing sites 45 securely connect the tethering members 20 to compacting securing panel 40. In some exemplary embodiments, tethering members 20 may be permanently connected with securing sites 45, while in further exemplary embodiments, the tethering members 20 may be removable from the compacting securing panel 40.

In still further embodiments, securing sites 45 may be holes projecting through subdivided panels 41. The holes allow the tethering members 20, which are connected at one end to ground stabilizing components 10 to pass through. In yet further embodiments, securing sites 45 may contain structures for securing tethering members 20 and holes, to allow compacting securing panel 40 to be used with or without ground stabilizing components 10. In some embodiments, securing sites 45 may include permanently attached tethering members 20 with permanently attached engaging components 30.

In the embodiment shown, the compacting securing panel 40 is placed under the animal prior to performing field dressing. If the ground is frozen, compacting securing panel 40 may help secure an animal without using ground stabilizing components 10.

Restraining the front legs of the animal is not required for the field dressing system 1, 2.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An animal dressing system, comprising:

a plurality of ground stabilizing components, each ground stabilizing component includes a handle element and a shaft element, said shaft element extends from said handle element;

a plurality of tethering members; and a plurality of engaging components, each engaging component includes a hook section, a gripping section and an attachment portion, one end of said gripping section extends from one end of said hook section, said gripping section haying a sufficient length to allow thereof to be grasped by a hand, the other end of said gripping section is terminated with said attachment portion, wherein one end of said plurality tethering members are secured to said plurality of ground stabilizing components, the other end of said plurality of tethering members are secured to said attachment portions of said plurality of engaging components.

2. The animal dressing system of claim 1, further comprising:

a tool component having a flat surface, a bladed surface, and a handle, said bladed surface is formed on one end of said tool component, said flat surface is formed on an opposing end of said tool component, said handle extends from said tool component.

3. The animal dressing system of claim 1 wherein:

at least one of said plurality of engaging components includes said hook section, a gripping section and said ring section, said hook section extends from one end of said gripping section, said ring section extends from the other end of said gripping section.

4. The animal dressing system of claim 1 wherein:

at least one of said plurality of tethering members is fabricated from one of an elastic material and a nylon material.

5. An animal dressing system, comprising:

a plurality of tethering members;

a plurality of engaging components, each engaging component including a hook section and an attachment portion; and a compacting securing panel having at least one securing portion formed in each end thereof, wherein one end of said plurality of tethering members is secured to said at least one securing portion, the other end of said at least one tethering member is secured to said one of said plurality of engaging components.

6. The animal dressing system of claim 5, further comprising:

a tool component having a flat surface, a bladed surface, and a handle, said bladed surface is formed on one end of said tool component, said flat surface is formed on an opposing end of said tool component, said handle extends from said tool component.

7. The animal dressing system of claim 5 wherein:

at least one of said plurality of engaging components includes said hook section, a gripping section and said ring section, said hook section extends from one end of said gripping section, said ring section extends from the other end of said gripping section.

8. The animal dressing system of claim 5 wherein:

at least one of said plurality of tethering members is fabricated from one of an elastic material and a nylon material.

9. The animal dressing system of claim 5 wherein:

said compacting securing panel having a plurality of subdivided surfaces extending from opposing sides thereof, said at least one securing portion is formed in said plurality of subdivided surfaces.

10. The animal dressing system of claim 5 wherein:

said at least one securing portion is at least one hole.

* * * * *